United States Patent [19]

Fortunato et al.

[11] Patent Number: 4,511,337
[45] Date of Patent: Apr. 16, 1985

[54] SIMPLIFIED HARDWARE COMPONENT INTER-CONNECTION SYSTEM FOR GENERATING A VISUAL REPRESENTATION OF AN ILLUMINATED AREA IN A FLIGHT SIMULATOR

[75] Inventors: Alfred R. Fortunato; Maurice Millard; John R. Trzeciak, all of Binghamton, N.Y.

[73] Assignee: The Singer Company, Binghamton, N.Y.

[21] Appl. No.: 392,205

[22] Filed: Jun. 25, 1982

[51] Int. Cl.³ .................................................. G09B 9/08
[52] U.S. Cl. ........................................ 434/43; 358/104
[58] Field of Search .......................... 434/43; 358/104

[56] References Cited

U.S. PATENT DOCUMENTS

| | | | |
|---|---|---|---|
| 4,177,579 | 12/1979 | Peters et al. | 434/43 |
| 4,343,037 | 8/1982 | Bolton | 434/43 |
| 4,348,184 | 9/1982 | Moore | 434/43 |
| 4,404,553 | 9/1983 | Cuffia | 358/104 |

*Primary Examiner*—Richard C. Pinkham
*Assistant Examiner*—Leo P. Picard
*Attorney, Agent, or Firm*—Douglas M. Clarkson

[57] ABSTRACT

The disclosure describes how, by starting with the final equation (11) in U.S. Pat. No. 4,177,579 and by making certain assumptions and by rearranging, collecting and reducing the equation further, the apparatus to produce the same result will cut the cost dramatically. All of this is accomplished in accordance with a demonstrated mathematical relationship.

1 Claim, 15 Drawing Figures

SIMPLIFIED HARDWARE COMPONENT INTER-CONNECTION SYSTEM FOR GENERATING A VISUAL REPRESENTATION OF AN ILLUMINATED AREA IN A FLIGHT SIMULATOR

The Government has rights in this invention pursuant to contract No. N61339-79-C-0102 awarded by the Department of the Navy.

BACKGROUND OF THE INVENTION

1. Field Of The Invention

This invention, generally, relates to a method and apparatus for displaying upon a viewing surface an image simulating a plane surface area illuminated by a light source and, more particularly, to an image simulating the ground area illuminated by a light source as viewed from an eye point within an aircraft

2. Description Of The Prior Art

This invention constitutes an improvement in the invention described and claimed in the U.S. Pat. No. 4,177,579 issued to Peters et al. on Dec. 11, 1979 and assigned to the same Assignee as the present invention.

Present day use of a simulator to train pilots and other aircraft personnel has become so widely accepted as to hardly warrant justification here. Such simulator apparatus today create a realistic aircraft environment that is designed to emphasize to each trainee that he is in and is operating an actual aircraft without leaving the ground.

To create this realism, the visual display system is a vitally important element. Many training judgments depend upon the trainee's response to a visual cue. During a simulation of an actual flight operation, a pilot, navigator, etc. will view the external environment through an aircraft window. For example, while taking off and while landing a pilot will scan the runway and will operate the controls of the aircraft to maneuver it properly.

Present day simulators utilize the viewing surface of a cathode ray tube, such as a raster-scanned television display, to simulate a window view. The external environment, seen by a trainee pilot as he looks out the window, is produced as the beam of the television cathode ray tube traces the raster across the viewing surface, and the scene produced on the viewing surface is generated most effectively by the above-identified U.S. Pat. No. 4,177,579.

Most actual aircraft and helicopters utilize landing lights and spot lights. These lights are located usually at some point distant from the pilot, on the wings or on another part of the aircraft, for example. The source of these lights also is adjustable usually by the pilot since they are important as a visual aid during night operation in order to provide ground illumination. Some aircraft, helicopters particularly, find spot lights extremely important where landing and taking off from confined areas are required. Simulators in the past have imposed an unrealistic burden on trainee's learning night operations by not providing an accurate simulation of an illuminated ground area, as well as both geographical references and altitude cues.

The unique characteristic produced by a directed beam of light in changing its shape on the illuminated ground area during changes in aircraft attitude and position was not provided prior to the invention described in the above-identified U.S. Pat. No. 4,177,579.

As an aircraft changes its attitude and position, the area that is illuminated on the ground by the spot light will change its shape, since the light is intersecting the ground from different directions.

Therefore, with aircraft and other types of simulators being used extensively as training devices today, a need arises for simulators that have a high degree of realism, and it is of substantially equal importance that these simulators be constructed as economically as possible. Therefore, since proper training requires accurate visual systems, it becomes particularly important, in those simulators which develop simulated directed beams of light illuminating a plan surface, that a visual system be provided which has an accurate simulation of this significant and most important visual cue, and today, such simulation must be provided at the lowest possible cost.

SUMMARY OF THE INVENTION

Therefore, it is a principal object of the present invention to provide a simulated view of a plane surface illuminated by a light source located at any distance from the eye point and from the plane surface and to provide such a simulated view at a cost more economical than heretofore available It is also an object of the present invention to provide a simulated view of a ground area illuminated by a light source located aboard an aircraft, where the ground area illuminated can change its shape corresponding to changes in the attitude or position of the aircraft or changes in the direction of a rotatable light source controlled by the aircraft operator, and to provide such simulated view with substantially less hardware.

The present invention provides apparatus for generating on the display surface of a single cathode ray tube an illuminated area having a predetermined geometrical configuration simulating the base of a cone of light that would be located on a more distant plane surface. The apparatus includes means for generating signals that are representative of changable relative geometrical relationships between locations and orientations of the illuminated area on the display surface as it is viewed from an eye point. These signals are generated representative of the location of the line of sight plane surface intersection point relative to a changable conic section generated by the intersection of a cone of light with the plane surface. A signal comparator responsive to these signals then determines whether the plane surface intersection point lies within or outside of the conic section. Video processing of the raster scanned display creates an illuminated area on the viewing surface corresponding to the plane surface intersection point when the intersection point lies within or on the conic section.

The foregoing and other features and advantages will become more apparent in the light of the following detailed description of the preferred embodiment as illustrated in the accompanying drawings.

DETAILED DESCRIPTION

Figure 1:
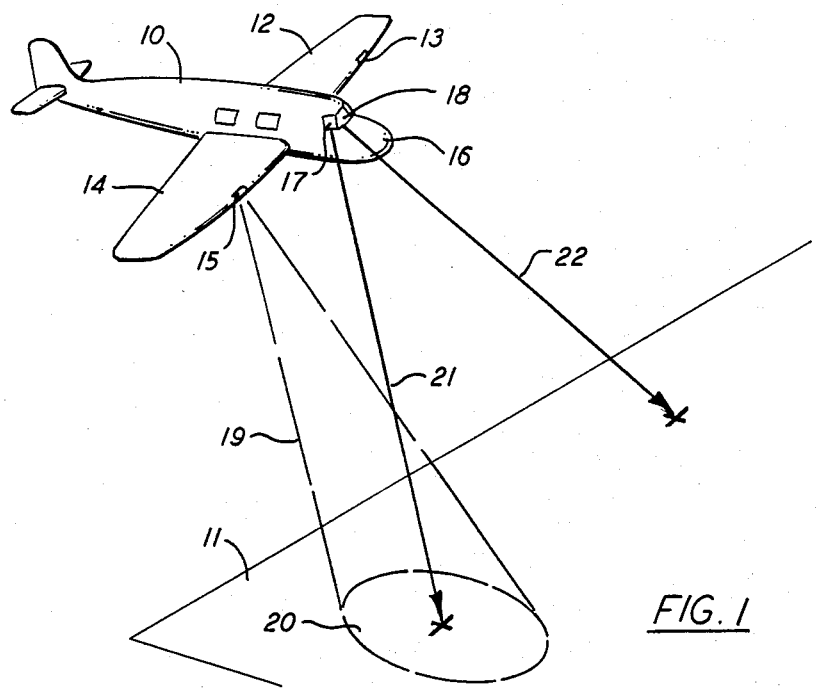
FIG. 1 illustrates an aircraft environment which the invention can simulate viewing a cone of light on a more distant plane surface through a side window of the aircraft.

The same reference numerals will be used throughout the several figures of the drawings to identify the same or like component parts of the present invention.

Figure 2:
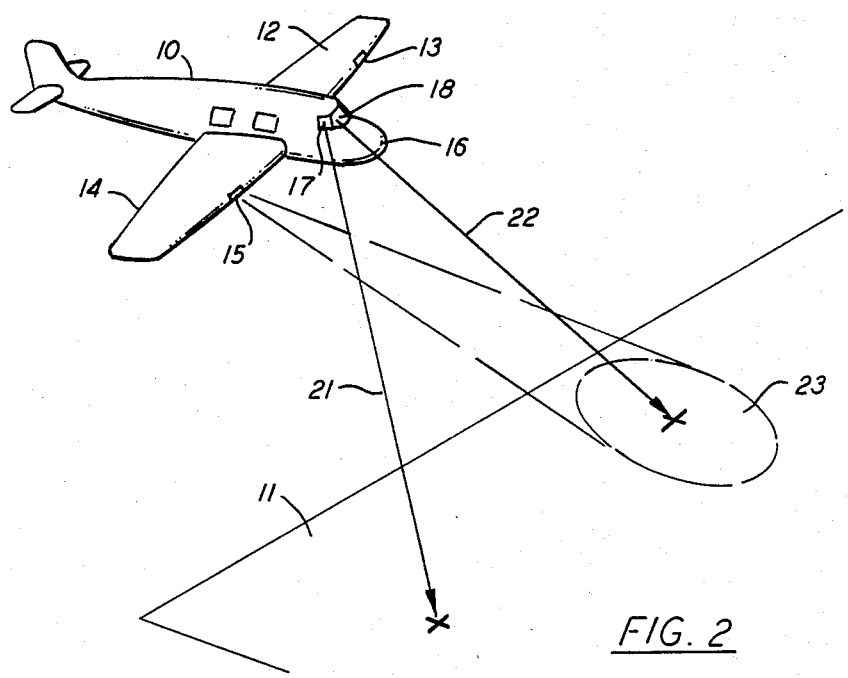
FIG. 2 is a view similar to FIG. 1 viewing the light on the more distant plane surface through a front window of the aircraft.

Referring now to FIGS. 1 and 2 of the drawings, an aircraft 10 is illustrated somewhat diagrammatically as it approaches a runway 11. Although the invention is not limited to any particular form of aircraft, the type of aircraft shown in these views has a left wing 12 with a light 13 and a right wing 14 with a similar light 15.

It should be noted at the outset that the particular name given to the lights 13 and 15 is not significant to the present invention. While these lights 13 and 15 may be termed "landing lights", "search lights", "spot lights", etc., they will be called hereinafter "spot lights" for the sake of uniformity only. It should be noted also at the outset that the location of these spot lights 13 and 15 is not significant to the invention. They may be located, for example, on the underside of the aircraft 10, on the landing gear (not shown), on the nose 16, etc.

In a multi-window environment, it has been noted that for a separation between the windows, such as between side window 17 and front window 18, equal to at least 36° between the edges of the front window 18 and the side window 17, one could only observe the effects of a spot light in one window at any given time. For example, as seen in FIG. 1, the light 15 generates a cone of light 19 terminating in a spot of light 20 in the ground plane of the runway 11, and while this is visible through the side window 17 along a line 21, nothing may be seen through the front window 18 along a line 22. Similarly, as viewed in FIG. 2, by rotating the light source 15, it will be moved from the spot 20 (in FIG. 1) to a spot 23 (in FIG. 2) where it will now be visible through the front window 18 along the same line 22. In this instance, as illustrated in FIG. 2, looking through the side window 17 along the line 21 no light will be visible Repeating the above in different words, a spot of light will be visible on the ground plane through either side window 17 or front window 18, but not both windows, when the space between these windows is at least 36° and when the apparent beam angle is approximately 12°.

A system to achieve the features discribed above in connection with the views in FIGS. 1 and 2 will achieve the principal object of the invention which is to provide a system for permitting simulation of a spot of light in a visual scene of a simulator using a single signal generator. The output of this single signal generator is switched selectively to respective window display screens of the simulator, and while some of the features of the present invention may appear to be similar to those in U.S. Pat. No. 4,177,579; it should be recognized that only the end result sought to be achieved by the present invention is similar to that of this patent. The single system of the present invention is completely different from that of the prior patent, which now will be demonstrated.

Figure 3:
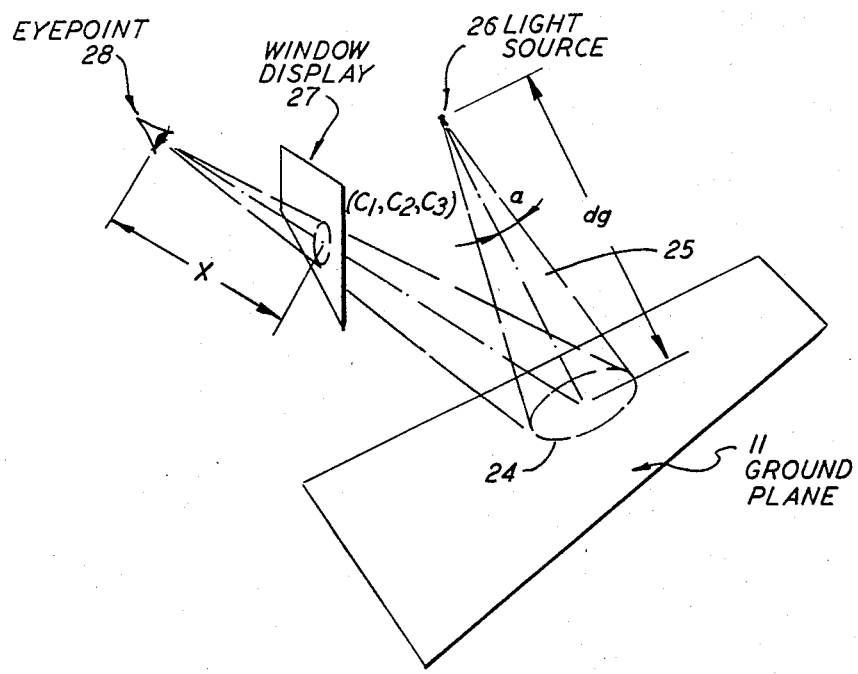
FIG. 3 is a diagrammatic illustration of the relationship of a cone of light, an eye point, a ground plane and a light source.
Figure 4:
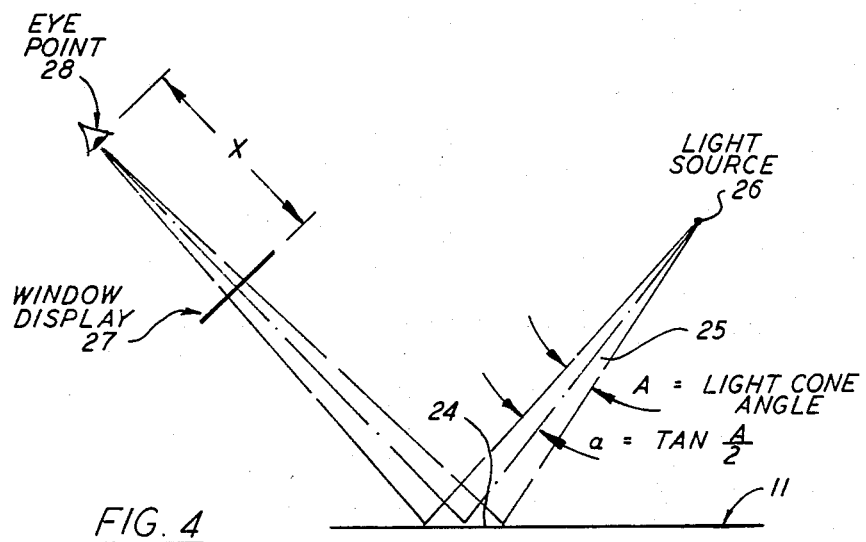
FIG. 4 is a further diagrammatic illustration of the view shown in FIG. 3 in order to illustrate and define several relationships to be used in the detailed description to follow.

Referring primarily now to FIGS. 3 and 4 of the drawings, a spot of light 24 is developed within the plane of the runway 11 as the base of a light cone 25 generated by a light source 26.

The single signal generator, not shown in FIG. 3 or in FIG. 4, (to be described in detail presently) is to generate on a window display screen of a cathode ray tube a spot of light having particular coordinates to match the spot of light 24 as viewed from an eye point 28. During the following detailed description of the single signal generator and how it is developed, these two figures will be referred to for definitions indicated therein.

Figure 5:
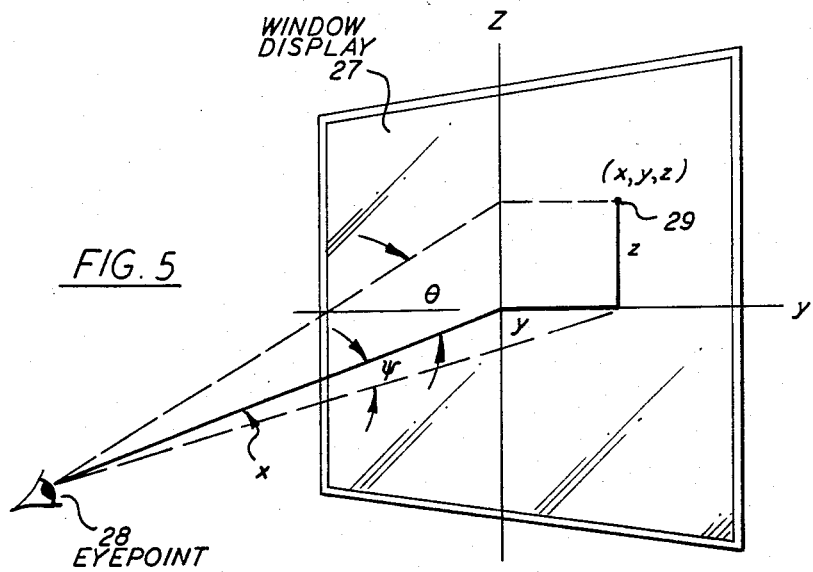
FIG. 5 is a diagrammatic illustration showing a relationship between the eye point and a window display in order to illustrate several definitions to be used hereinafter.

In FIG. 5 now, there are indicated still more definitions of angles and distances between the eye point 28 and the window display 27 which will be used in the development of the single signal generator system to be discribed in greater detail presently. The point 29 on the window display 27 is an instantaneous position of the scanline of the cathode ray tube, and it has been found that if the distance "X" from the eye point 28 is taken to the center of the window display screen 27 rather than to a particularly instantaneous point position 29, it will be illustrated in the detailed description to follow that the equations are simplified greatly.

Figure 6:
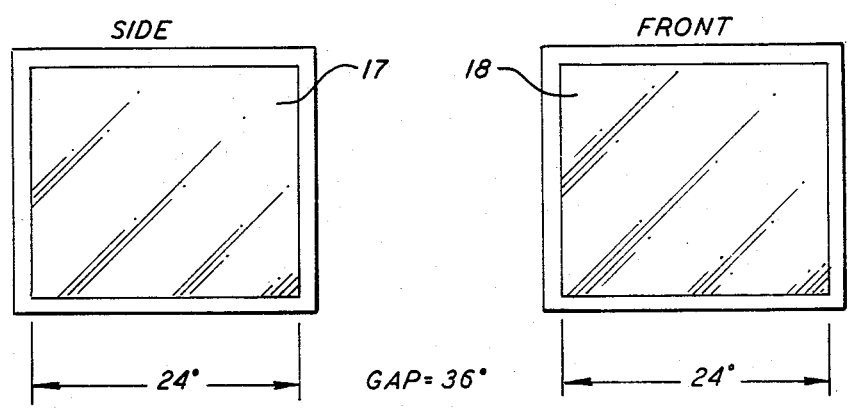
FIG. 6 is an illustration of the relative location of two windows in a simulator in order to realize the full cost-saving feature made available by the present invention.

In FIG. 6 of the drawings, it is illustrated that if the distance separating the side window 17 from the front window 18 is at least equal to (preferably greater than) than the spot of light 24 translated to the window display screen 27, then a single signal generator system in accordance with the teachings of this invention will greatly reduce the cost of simulating the spot of light. In the particular situation which lies to the present invention, the apparent beam angle of the light was 12° and the distance between adjacent edges of the windows was 36°.

Figure 7:
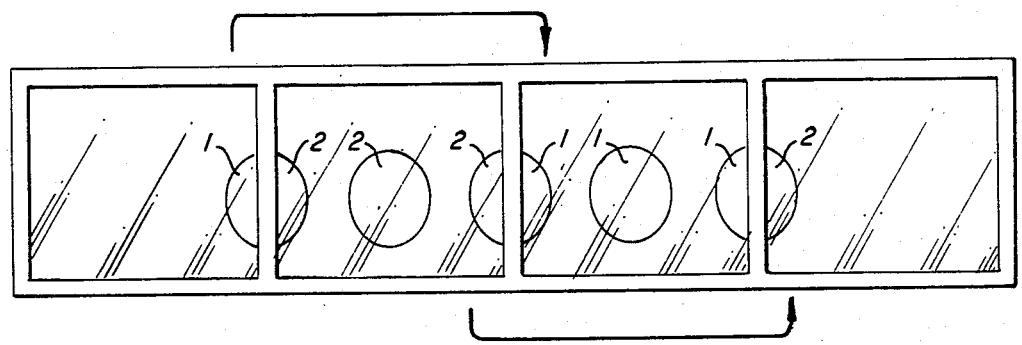
FIG. 7 is a multiple window environment to show how the cost of hardware may be reduced substantially by using the present invention as compared with the prior art.

However, as illustrated in FIG. 7 of the drawings, if the windows are placed closer together than the apparent beam angle (as discussed in connection with FIG. 6), two systems of the present invention will accomplish the simulation of the of a spot of light from one window as it will sweep across four windows rather than having four systems as taught by U.S. Pat. No. 4,177,579. In this view, system "1" generates a spot of light on the screen simulating the first window surface. As the spot of light moves off the edge of this first window, it will be picked up by signal generator system "2" in the second window.

The second signal generator system "2" will then carry the beam across the second window, and the first signal generator system "1" will pick up the spot of light as it appears on the third window. The signal generator system "1" will carry this spot of light across the third window, and as it would appear on the fourth screen, the second signal generator "2" will then be switched over to the fourth window to continue the sweep of the spot of light.

Most simulators today use digital computers to determine known values of the environment of the aircraft and the associated geometry, and they are used to store also this information for use by many of the electrical networks used by the simulator. As an example, a simulated altimeter indication must respond to computer information providing altitude data.

Figure 8:
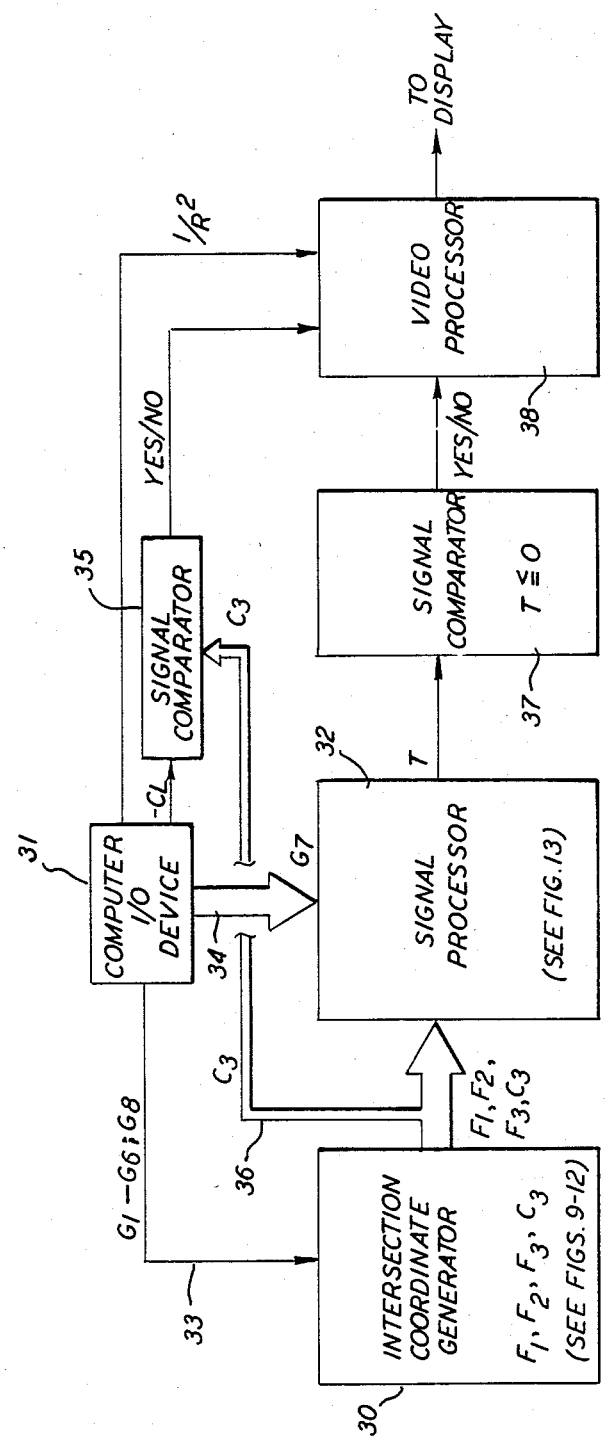
FIG. 8 is a block diagram of the preferred embodiment of the present invention.

To appreciate the distinction between FIG. 8 of the present invention and FIG. 8 of U.S. Pat. No. 4,177,579; the following more detailed description must be followed carefully.

Beginning with the following equation (1) which is the same as the final equation (11) in our prior U.S. Pat. No. 4,177,579 which represents the basic equation for determining the shape of the simulated light beam:

$$\pi_1 C_1^2 + \pi_2 C_2^2 + \pi_3 C_1 C_2 + \pi_4 C_1 C_3 + \pi_5 C_2 C_3 + \pi_6 C_3^2 < 0 \quad (1)$$

where:
$C_1 = b_{11} + b_{12} \text{Tan}\Psi_s + b_{13} \text{Tan}\theta_s$
$C_2 = b_{21} + b_{22} \text{Tan}\Psi_s + b_{23} \text{Tan}\theta_s$
$C_3 = b_{31} + b_{32} \text{Tan}\Psi_s + b_{33} \text{Tan}\theta_s$
and
$\Psi_s, \theta_s$ = Horizontal and Vertical Sweep Angles $b_{ij}$
= Elements of the Display Axis to Ground Axis Direction Cosine Matrix (the i and j representing "row" and "column" in the Matrix)
and
$\pi_1 = (a_{21}^2 + a_{31}^2 - a^2 a_{11}^2) d_G^2$
$\pi_2 = (a_{22}^2 + a_{31}^2 - a^2 a_{11}^2) d_G^2$
$\pi_3 = (a_{21} a_{22} + a_{31} a_{32} - a^2 a_{11} a_{12}) 2 d_G^2$
$\pi_4 = (a_{21} a_{23} + a_{31} a_{33} - a^2 a_{11} a_{13}) 2 d_G^2 + (a_{21} Y_{ep} + a_{31} Z_{ep} - a^2 a_{11} X_{ep}) 2 d_G$
$\pi_5 = (a_{22} a_{23} + a_{32} a_{33} - a^2 a_{12} a_{13}) 2 d_G^2 + (a_{22} Y_{ep} + a_{32} Z_{ep} - a^2 a_{12} X_{ep}) 2 d_G$
$\pi_6 = (a_{23}^2 + a_{33}^2 - a^2 a_{13}^2) d_G^2 + (Y_{ep}^2 + Z_{ep}^2 - a^2 X_{ep}^2)$
where:
$a_{ij}$ = Elements of Ground Axis to Light Axis Direction Cosine Matrix
$d_G$ = Length of Normal from Light Origin to Ground Plane
$a$ = Tangent of Semi-Beam Angle
$X_{ep}, Y_{ep}, Z_{ep}$ = Coordinates of the Pilot Eye in the Light Axis Frame Relative to the Light Axis Origin.

In each of the above-identified $\pi$ terms substitute for each "$a_{ij}$" terms having a row designation of 2 or 3, i.e., where the "i" is "2" or "3", substitute a "1". Then, with each of the above-identified $\pi$ terms so modified, i.e., terms $\pi_1$ through $\pi_6$, rewrite equation (1) substituting for each of the $\pi$ terms the values of the modified $\pi$ values.

Now, making the assumption that the eye point and the source of light are not separated by any distance and collecting and rearranging the terms, equation (1) may be reduced to the following:

$$d_G^2(C_1^2 + C_2^2 + C_3^2) - (1 + a^2) d_G^2 (a_{11} C_1 + a_{12} C_2 + a_{13} C_3^2) + \quad (2)$$
$$2 d_G[(X_{ep} - (1 + a^2) a_{11} X_{ep}) C_1 + (Y_{ep} - (1 + a^2) a_{12} X_{ep}) C_2 +$$
$$(Z_{ep} - (1 + a^2) a_{13} X_{ep}) C_3] C_3 + (R_{ep}^2 - (1 + a^2) X_{ep}^2) C_3^2 \leq 0$$

Remembering that, by definition, $a_{ij}$ is the ground axis to light axis direction cosine matrix, as follows:

$$\begin{bmatrix} X_L \\ Y_L \\ Z_L \end{bmatrix} = a_{ij} \begin{bmatrix} X_G \\ Y_G \\ Z_G \end{bmatrix} \quad (3)$$

Also remembering that, by definition, $b_{ij}$ is the display axis to ground axis direction cosine matrix, which is expressed as follows:

$$\begin{bmatrix} X_G \\ Y_G \\ Z_G \end{bmatrix} = b_{ij} \begin{bmatrix} X_D \\ Y_D \\ Z_D \end{bmatrix} \quad (4)$$

Finally, remembering that, by definition, $D_{ij}$ is the display axis to light axis direction cosine matrix, and is expressed as follows:

$$\begin{bmatrix} X_L \\ Y_L \\ Z_L \end{bmatrix} = D_{ij} \begin{bmatrix} X_D \\ Y_D \\ Z_D \end{bmatrix} \quad (5)$$

where:

$$D_{ij} = [a_{ij}][b_{ij}]$$

Therefore, the following relationship, expressed as equation (6), obtains:

$$(a_{11} C_1 + a_{12} C_2 + a_{13} C_3) = (D_{11} + D_{12} \text{Tan}\Psi + D_{13} \text{Tan}\theta)$$

In the real world, however, the eye point and the light origin are not located at the same position on an aircraft, but they are offset by a distance, which is known and which is fixed. Therefore, the effects of this offset will have an influence on the shape of the spot of light as it appears on the display screen. Note also that, in these equations, the term "$C_3$" is required to compute light "cut off" functions, such as to avoid unrealistic affects of the light beam occurring above the horizon.

Therefore, going back to equation (2), but remembering the definitions hereinabove, the expression of the light beam shape becomes as follows:

$$(X_{GEP} - (1 + a^2) a_{11} X_{ep}) C_1 + (Y_{GEP} - (1 + a^2) a_{12} X_{ep}) C_2 + \quad (7)$$
$$(Z_{GEP} - (1 + a^2) a_{13} X_{ep}) C_3 =$$
$$(X_{DEP} + Y_{DEP} \text{Tan}\Psi + Z_{DEP} \text{Tan}\theta) -$$
$$(1 + a^2) X_{ep} [D_{11} + D_{12} \text{Tan}\Psi + D_{13} \text{Tan}\theta]$$

where $X_{DEP}, Y_{DEP}, Z_{DEP}$ are the corrdinates of the eye point in the display frame relative to the light origin.

Now, the final form of the equation, after dividing through by $d_G^2$, is written as follows:

$$(1 + \text{Tan}^2\Psi + \text{Tan}^2\theta) - \quad (8)$$

-continued
$$(1 + a^2)(D_{11} + D_{12}\text{Tan}\Psi + D_{13}\text{Tan}\theta)^2 +$$

$$2\left[\left(\frac{X_{DEP}}{d_G} - (1 + a^2)D_{11}\frac{X_{ep}}{d_G}\right) + \right.$$

$$\left(\frac{Y_{DEP}}{d_G} - (1 + a^2)D_{12}\frac{X_{ep}}{d_G}\right)\text{Tan}\Psi +$$

$$\left.\left(\frac{Z_{DEP}}{d_G} - (1 + a^2)D_{13}\frac{X_{ep}}{d_G}\right)\text{Tan}\theta\right]C_3 +$$

$$\left[\left(\frac{R_{ep}}{d_G}\right)^2 - (1 + a^2)\left(\frac{X_{ep}}{d_G}\right)^2\right]C_3^2 \leq 0$$

The above equation (8) effectively normalizes the light coordinates in the display and in the eye point coordinates relative to the height of the aircraft above the ground.

Now, simplifying the above equation by collecting several of the terms and representing them as $G_1$ through $G_8$, the final equation may be simplified as follows:

$$G_8(1+\text{Tan}^2\Psi+\text{Tan}^2\theta)-(G_1+G_2\text{Tan}\Psi+G_3\text{Tan}\theta)^2+(G_4+G_5\text{Tan}\Psi+G_6\text{Tan}\theta)C_3+G_7C_3^2<0 \quad (9)$$

Where:

$$G_1 + (1 + a^2)^{\frac{1}{2}}D_{11}$$

$$G_2 = (1 + a^2)^{\frac{1}{2}}D_{12}$$

$$G_3 = (1 + a^2)^{\frac{1}{2}}D_{13}$$

$$G_4 = 2\left\{\frac{X_{DEP}}{d_G} - (1 + a^2)D_{11}\frac{X_{ep}}{d_G}\right\}$$

$$G_5 = 2\left\{\frac{Y_{DEP}}{d_G} - (1 + a^2)D_{12}\frac{X_{ep}}{d_G}\right\}$$

$$G_6 = 2\left\{\frac{Z_{DEP}}{d_G} - (1 + a^2)D_{13}\frac{X_{ep}}{d_G}\right\}$$

$$G_7 = \left\{\left(\frac{R_{ep}}{d_G}\right)^2 - (1 + a^2)\left(\frac{X_{ep}}{d_G}\right)^2\right\}$$

$G_8 = 1.0$ (This term "$G_8$" is included to allow normalization by the largest "$G$" term in the event that it is greater than 1.0)

It becomes apparent that the only term in equation (9) that is similar to any term in U.S. Pat. No. 4,177,579 is the following:

$$C_3 = b_{31} + b_{32}\text{Tan}\Psi + b_{33}\text{Tan}\theta$$

and, as stated above, the term "$C_3$" is required in order to compute the light "cut off" function.

The signals developed by the image generator in accordance with equation (9) are unique because the values of the term $D_{ij}$ are for a given window. With the separation between the windows as discribe hereinabove, only one light generator system is required for the entire simulator, permitting the realization of substantial savings. The single light generator system, therefore, is switched from window display to window display, depending upon where the light should be visible.

The dramatic savings in cost by a system constructed in accordance with the present invention is realized by the unique construction of an Intersection Coordinate Generator 30, the different Computer Input-Output Device 31 and the simplicity of Signal Processor 32 as seen in FIG. 8 in the drawings Details of the Intersection Corrdinate Generator 30 is given in FIGS. 9-12 and will be described in more detail presently.

The Computer Input-Output Device 31 generates the values for $G_1$-$G_8$ and connects the values of $G_1$-$G_6$ and $G_8$ to the Intersection Coordinate Generator 30 by a bus 33. Similarly, the values for $G_7$ are connected by a bus 34 directly to the Signal Processor 32 which will be explained in more detail presently also.

As the altitude of the aircraft increases, the distance from the eye point to the ground plane increases also, and the illuminated area would become dimmer in the real world. This is accomplished in a simulator by the computer 31 generating a signal indicated as $-C_L$ in FIG. 8 which is a predetermined value and which is connected directly to a signal comparator circuit 35. In the signal comparator circuit 35, the predetermined value of $-C_L$ is compared with the value of $C_3$, which is the result of a signal developed by the Intersection Coordinate Generator 30 and connected to the signal comparator 35 by a bus 36. The output of the signal comparator circuit 35 will establish when no display illumination should appear due to the spot of light.

However, before a cut off point is reached in the illumination of the display, the computer 31 generates a signal designated $1/R^2$ which causes the intensity of the simulated spot of light to vary inversely proportional to the square of the distance from the eye point to the ground. Another signal comparator circuit 37 also produces a cut of signal to indicate that no illumination due to the spot of light should appear in the display when the values of the calculations in accordance with the present invention exceed the value of zero.

At least one video processor circuit 38 is indicated in FIG. 8 which receives these illumination display intensity signals from the various sources just described above and converts them to a signal which modulates the display of the cathode ray tube viewing surface in accordance with these signals.

Figure 9:
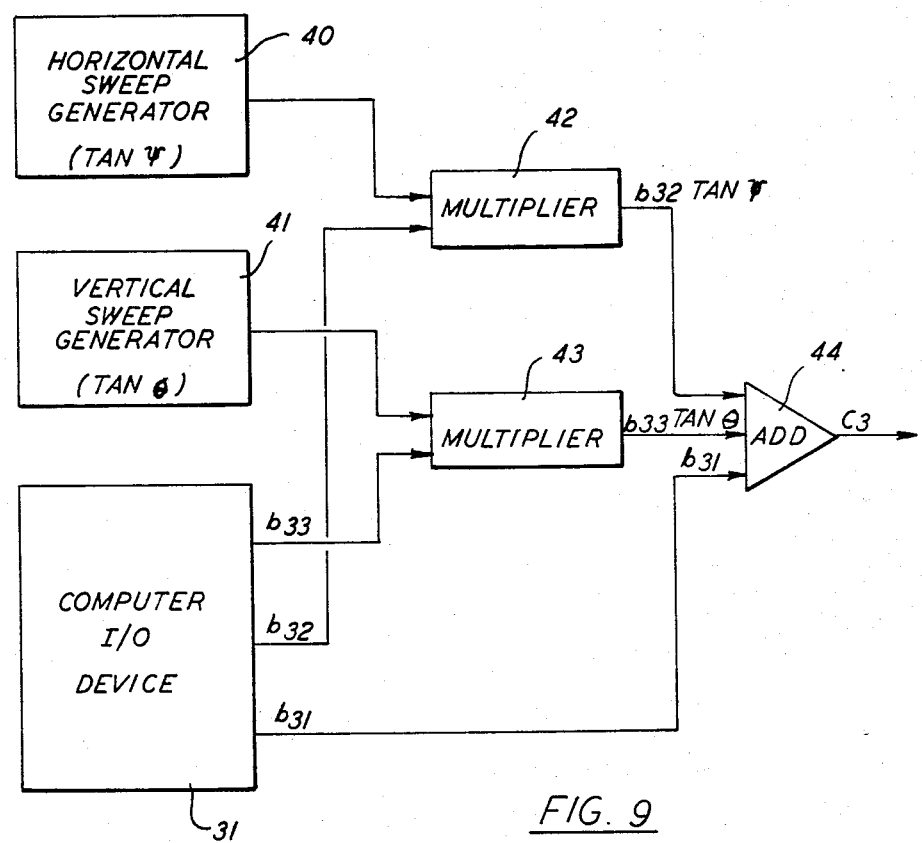
FIGS. 9, 10, 11 and 12 are broad diagrams illustrating the component parts of a line of sight generator in accordance with the present invention.
Figure 11:
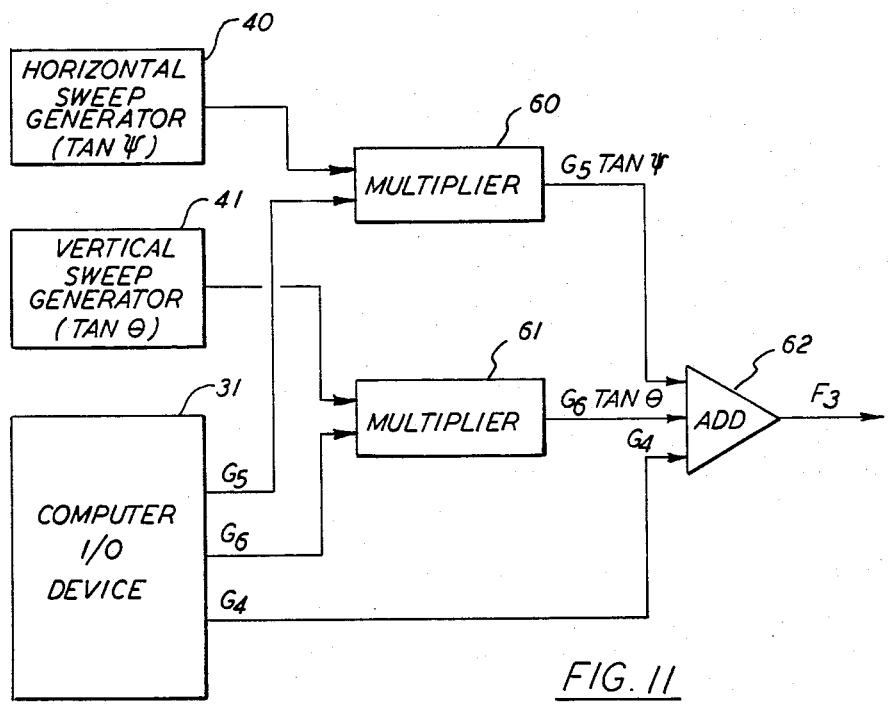
Figure 12:
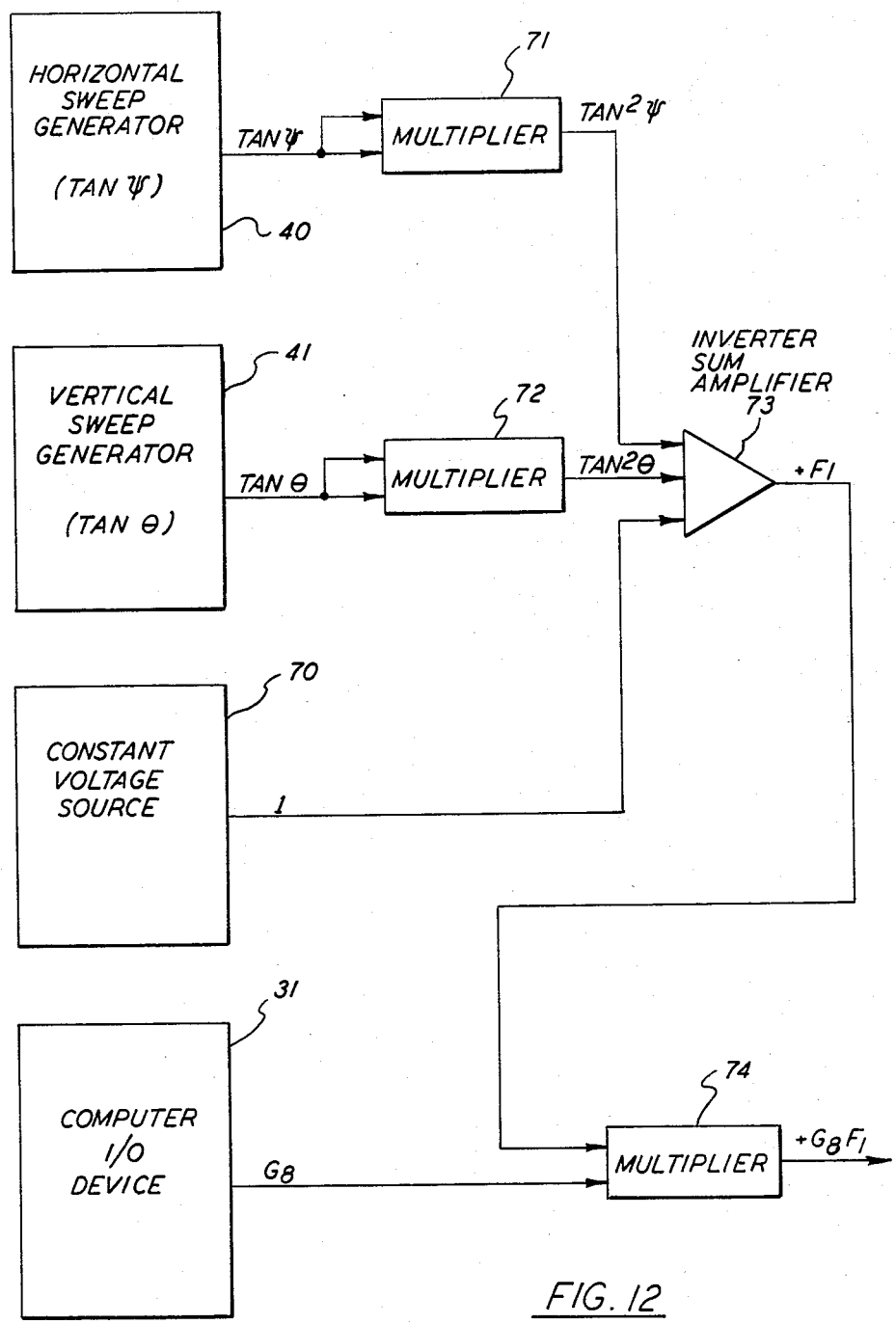
Figure 13:
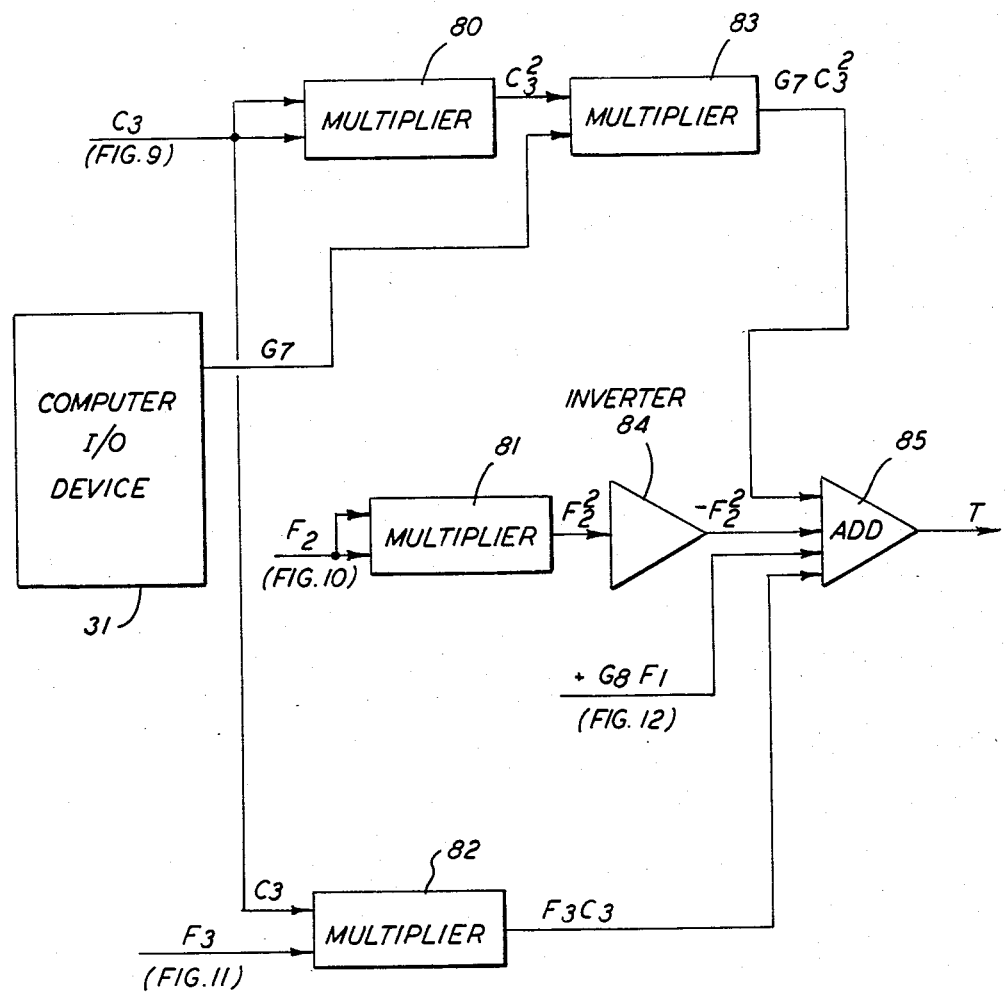
FIG. 13 is a block diagram of a signal processor constructed and arranged in accordance with the principles of the present invention.

Returning now to a more detailed description of the particular circuits arranged in accordance with the present invention and as shown in FIGS. 9—12 and in FIG. 13, referring first to FIG. 9, the computer I/O device 31 computes and provides signals representative of the display axis to ground axis direction cosine matrix elements designated $b_{31}$, $b_{32}$ and $b_{33}$. A horizontal sweep generator 40 generates a signal, $\text{Tan}\Psi$, and a vertical sweep generator 41 generates a signal, $\text{Tan}\theta$, both being described in connection with FIG. 5 of the drawings. Two multiplier circuits 42 and 43 are the only components necessary to provide signals representative of the values $b_{32}\text{Tan}\Psi$ and $b_{33}\text{Tan}\theta$, and an ADD circuit 44 sums these signals with the signal $b_{31}$ from the computer 31 to provide an output signal representative of the value $C_3$ which, as stated previously, is needed to compute the illumination "cut off" functions.

Figure 10:
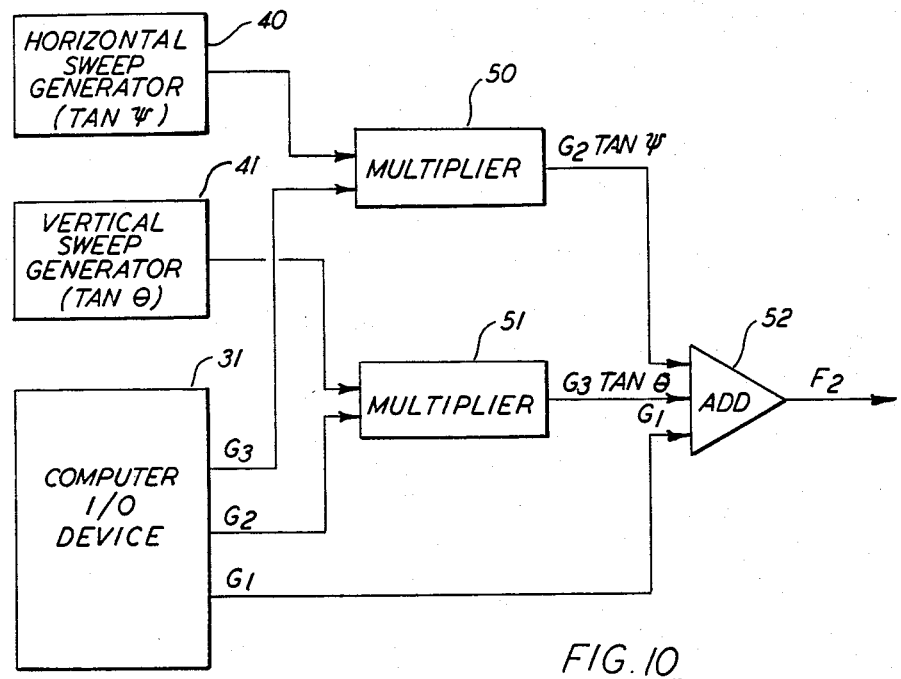

In FIG. 10 in the drawings, the same components 31, 40 and 41 as described in connection with FIG. 9, are used to combine the $\text{Tan}\Psi$ and the $\text{Tan}\theta$ values with values representative of the functions $G_1$, $G_2$ and $G_3$ developed by the computer 31. The values of the terms $G_1$, $G_2$ and $G_3$ are defined in equation (9) hereinabove. Two multiplier circuits 50 and 51 and a single ADD circuit 52 are the only components required to combine the signals in order to generate a function, $F_2$, necessary for the second function in equation (9) hereinabove:

$$(G_1 + G_2 \text{Tan}\Psi + G_3 \text{Tan}\theta).$$

In FIG. 11 of the drawings, the horizontal sweep generator 40, the vertical sweep generator 41 and the computer 31 develop these signals to combine the functions $\text{Tan}\Psi$, $\text{Tan}\theta$, $G_4$, $G_5$ and $G_6$. The only components needed are two multiplier circuits 60 and 61 and an ADD circuit 62 to provide a function, $F_3$, which is the third function in equation (9) hereinabove:

$$(G_4 + G_5 \text{Tan}\Psi + G_6 \text{Tan}\theta).$$

In FIG. 12 in the drawings, the horizontal sweep generator 40, the vertical sweep generator 41 and the computer 31 along with a constant voltage source 70 produce signals which are combined in multipliers 71 and 72, respectively, and an inverter amplifier 73 and a multiplier circuit 74 to develop the first function in the equation (9) hereinabove:

$$G_8(1 + \text{Tan}^2\Psi + \text{Tan}^2\theta).$$

The signal processor circuit 32, FIG. 8, receives an input, $G_7$, from the computer 31 and the functions $F_1$, $F_2$, $F_3$ and $C_3$ from the Intersection Coordinate Generator 30 as indicated in FIG. 13 of the drawings. By the use of only four multiplier circuits, 80, 81, 82 and 83, along with an inverter 84 and an ADD circuit 85, a term "T" is developed responsive to the respective signals input, as clearly shown in FIG. 13.

Figure 14:
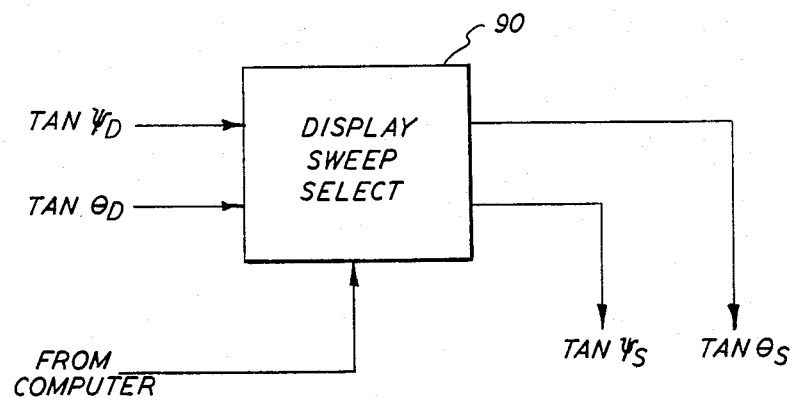
FIG. 14 is a block diagram to illustrate the relationship between certain elements for use in the following description.

FIG. 14 of the drawings indicates diagrammatically how the horizontal and vertical sweeps are under the control of the computer in order to select which of the window display units in a simulator the output horizontal and vertical sweeps may be switched too. For example, as a pilot or a co-pilot manipulates the direction of the light beam by his controls, that generates a signal for the computer which, in turn, can furnish the signal for the sweep select display 90 shown in FIG. 14.

Figure 15:
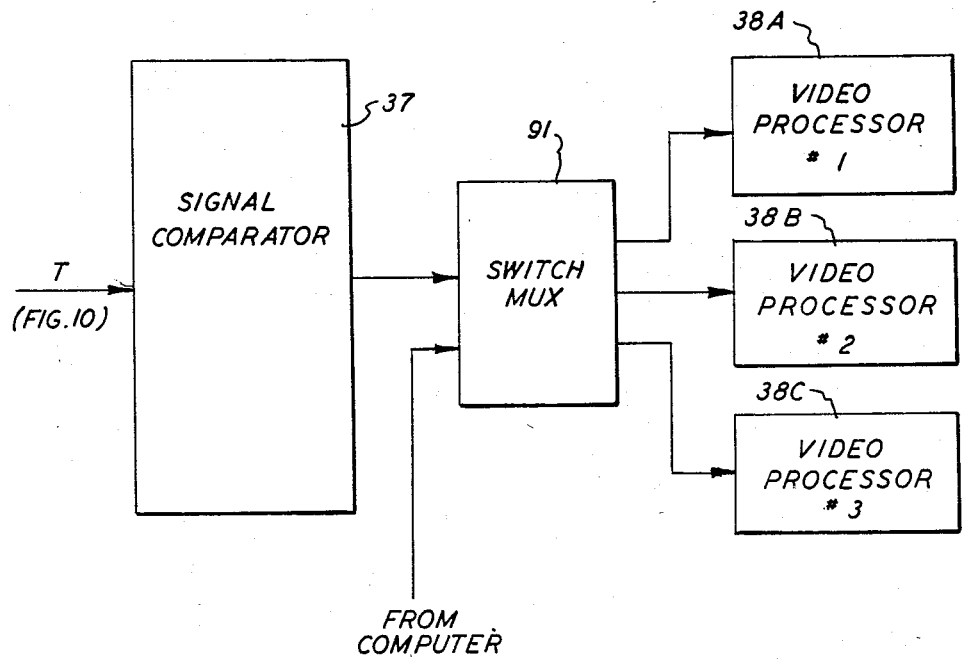
FIG. 15 is a block diagram showing the interrelationship of a signal comparator and respective video processor circuits, to be explained in more detail in the following description.

In FIG. 15 of the drawings, the output of the signal comparator circuit 37 is seen to be connected through a switch multiplexer circuit 91, also being controlled by the computer 31, in a similar manner to that just explained in connection with FIG. 14, to switch the spot of light signal from window display to window display, represented by video processors 38A, 38B and 38C.

This invention has been described in terms of a light source located on an aircraft illuminating a ground plane, such as a runway, so that the pilot, or the copilot, within the aircraft can look through a selected aircraft window and view the illuminated ground area. It will be apparent to those skilled in the art that various changes and modifications may be made without departing from the invention. The invention is intended to cover all such changes and modifications as fall within the true spirit and scope of the invention as defined by the appended claims.

We claim:

1. Apparatus for generating, on the display surface of a raster scan device, an illuminated area having a predetermined geometrical configuration simulating the base of a cone of light that would be visible on a more distant plane surface, where the orientation of said cone of light can be varied, and said geometrical configuration is adjustable in size and shape to simulate changes in position of said base on said plane surface as the orientation of said cone of light is varied, comprising:

computer I/O means to compute and to provide signals representative of the display axis to ground axis direction cosine matrix elements, $b_{31}$, $b_{32}$, and $b_{33}$, and various values of a light shape coefficient, $G_1$ through $G_8$;

horizontal sweep generator means to generate a signal $\text{Tan }\Psi$ and a vertical sweep generator means to generate a signal $\text{Tan }\theta$ to represent instantaneous azimuth and elevation values, respectively, of the base of a cone of light as the base appears on a display device;

a first multiplier circuit means to receive the output from said horizontal sweep generator means and to receive said signal from said computer I/O means that is representative of said element $b_{32}$ to provide a signal output representative of the function $b_{32} \text{Tan }\Psi$;

a second multiplier circuit means to receive the output from said vertical sweep generator means and to receive said signal from said computer I/O means that is representative of said element $b_{33}$ to provide a signal output representative of the function $b_{33} \text{Tan }\theta$;

first ADD circuit means to sum the functions $b_{32} \text{Tan }\Psi$ and $b_{33} \text{Tan }\theta$ with said signal $b_{31}$ from said computer I/O means, to provide an output signal representative of a value $C_3$ which is the related vertical component of the display surface;

a third multiplier circuit means to receive a light shape coefficient value signal $G_3$ output from said I/O means and to receive said $\text{Tan }\Psi$ signal to generate a function $G_3 \text{Tan }\Psi$;

a fourth multiplier circuit means to receive a light shape coefficient value signal $G_2$ output from said computer I/O means and to receive said $\text{Tan }\theta$ signal to generate a function $G_2 \text{Tan }\theta$;

second ADD circuit means to sum the functions $G_3 \text{Tan }\Psi$ and $G_2 \text{Tan }\theta$ with a light shape coefficient value signal $G_1$ output from said computer I/O means to provide an output signal representative of a value $F_2$;

a fifth multiplier circuit means to receive a light shape coefficient value signal $G_5$ output from said computer I/O means and to receive said $\text{Tan }\Psi$ signal to generate a function $G_5 \text{Tan }\Psi$;

a sixth multiplier circuit means to receive a light shape coefficient value signal $G_6$ output from said computer I/O means and to receive said $\text{Tan }\theta$ signal to generate a function $G_6 \text{Tan }\theta$;

third ADD circuit means to sum the functions $G_5 \text{Tan }\Psi$ and $G_6 \text{Tan }\theta$ with a light shape coefficient value signal $G_4$ output from said computer I/O means to provide an output signal representative of a value $F_3$;

first circuit means to provide signal values equal, respectively, to $\text{Tan}^2\Psi$ and $\text{Tan}^2\theta$;

a constant voltage source to provide a voltage output at a predetermined value;

inverter amplifier ADD circuit means to receive said $\text{Tan}^2 \Psi$ and $\text{Tan}^2 \theta$ signal values and to sum said values with said voltage output of the constant voltage source to provide an output signal representative of a value $F_1$;

a seventh multiplier circuit means to receive said value $F_1$ and to receive a light shape coefficient value signal $G_8$ from said computer I/O means to provide an output signal representative of a value $G_8 F_1$;

second circuit means to receive said value $C_3$ and to provide a signal value output equal to $C_3^2$;

eighth multiplier circuit means to receive said $C_3^2$ signal and a light shape coefficient value signal $G_7$ from said computer I/O means to provide an output signal representative of a value $G_7 C_3^2$;

third circuit means to receive said value $F_2$ and to provide a signal value output equal to $F_2^2$;

ninth multiplier circuit means to receive also said value $C_3$ and said value $F_3$ to provide an output signal representative of a value $F_3 C_3$;

fourth ADD circuit means to sum the four functions $G_7 C_3^2$, $F_3 C_3$, $G_8 F_1$ and an inverted $F_2^2$ to provide an output signal representative of a value T;

a signal comparator circuit means to receive said value T to determine whether each point on said geometrical configuration would be visible; and a video processor responsive to said signal comparator circuit means for modulation of said raster scan device;

whereby the video modulation creates said illuminated area directly on said display surface corresponding to each point on said geometrical configuration that would be visible.

* * * * *